(12) United States Patent
Tilly

(10) Patent No.: US 7,040,545 B2
(45) Date of Patent: May 9, 2006

(54) HEAT GENERATOR

(75) Inventor: Christian Tilly, Uhldingen-Mühlhofen (DE)

(73) Assignee: BorgWarner Inc., Auburn Hills, MI (US)

( * ) Notice: Subject to any disclaimer, the term of this patent is extended or adjusted under 35 U.S.C. 154(b) by 136 days.

(21) Appl. No.: 10/686,078

(22) Filed: Oct. 15, 2003

(65) Prior Publication Data

US 2005/0098171 A1 May 12, 2005

(30) Foreign Application Priority Data

Oct. 16, 2002 (EP) ................................ 02023030

(51) Int. Cl.
*B60H 1/02* (2006.01)

(52) U.S. Cl. ............................ 237/12.3 R; 237/12.3 B; 165/41

(58) Field of Classification Search ........... 237/12.3 B, 237/12.3 R; 165/41, 42
See application file for complete search history.

(56) References Cited

U.S. PATENT DOCUMENTS

| 5,788,151 | A | * | 8/1998 | Moroi et al. ........... 237/12.3 R |
| 5,947,108 | A | * | 9/1999 | Ban et al. ................... 126/247 |
| 6,047,666 | A | * | 4/2000 | Ban et al. ..................... 122/26 |
| 6,059,198 | A | * | 5/2000 | Moroi et al. ........... 237/12.3 R |

\* cited by examiner

*Primary Examiner*—Derek S. Boles
(74) *Attorney, Agent, or Firm*—Greg Dziegielewski, Esq.

(57) ABSTRACT

A viscous fluid-type heat generating apparatus comprises a conveying rotor in communication with at least one channel for conveying a tempering fluid through it. The conveying rotor is mounted on a driven shaft. A shearing arrangement provides shearing forces onto viscous liquid situated in a chamber. This chamber is immediately formed within a hollow space of the conveyor rotor.

16 Claims, 2 Drawing Sheets

HEAT GENERATOR

TECHNICAL FIELD

The present invention relates to viscous fluid-type heat generating apparatus for heating a tempering fluid conveyed through a channel system by a conveying rotor.

BACKGROUND OF THE INVENTION

Various constructions of heating devices, which use shearing forces to generate heat, are known in the art. Examples may be found in U.S. Pat. Nos. 5,778,843; 6,047,896 and 6,138,920. Among these, the latter illustrates a rather complicate control of an independent heating unit substantially separated from the conveyor drive for the tempering fluid. Shearing is mainly effected in a conical, smooth shearing gap, as is known for other purposes from agitator mills. Smooth are also the surfaces of a shearing arrangement according to U.S. Pat. No. 5,778,843 which shows also a unit separated from the fluid conveyor, and similar is the construction of U.S. Pat. No. 6,047,896. Ir. the two latter cases, electromagnets are provided for control purposes.

In contrast to the above-mentioned smooth shearing surfaces, individual shearing parts according to DE-198 51 546-A1 or U.S. Pat. No. 6,039,264 are provided with projections and recesses facing a smooth wall. In the DE-document, the projections and recesses in-between extend in axial direction, while in the U.S. patent, radial slots are formed. In both cases, the heating devices are also formed as parts substantially separated from the tempering fluid circulation which, of course, requires more space.

Document EP-0 826 530-A2 suggests assembling the conveyor arrangement for the tempering fluid together with a shearing forces using heat generator in a more compact form. In this document, these two units form themselves separated modules which are merely flanged together. Rather high expenses had to be spent for controlling the circulation of the tempering fluid from one module to the other one as for the circulation of the viscous liquid.

All these heating devices are often used in automobiles, but could also be applied in other spaces or vehicles, such as ships, planes, or even in the room of a house.

SUMMARY OF THE INVENTION

It is an object of the present invention to find a more compact design for a viscous fluid-type heat generator. A further object of the present invention is to increase the efficiency of a viscous fluid-type heat generator. Another object of the present invention is to simplify the control of a viscous fluid-type heat generator. A still further object of the present invention is to omit valve control units as much as possible in viscous fluid-type generators.

These and other objects are achieved or made possible with the present invention. In the present invention, the conveying rotor is hollow to form a chamber which receives the viscous fluid. The shearing arrangement is provided in this chamber. With the present invention, the heat generating apparatus is integrated into the pumping or conveying unit (however it may be constructed in detail), thus resulting in a more compact design.

At the same time, the efficiency of the heat generator is increased because the drive for the pumping or conveying unit provides also energy for shearing. Moreover, since the chamber is now immediately in that part which is permanently in contact with the tempering fluid, heat conduction is improved and the generator works practically without any loss. Furthermore, the construction of the housing is simplified since both units are accommodated together. In addition, control is also simplified, because a control for distributing the different fluids is no longer necessary.

The invention relates to a viscous fluid-type heat generating apparatus which comprises a housing and a space or channel in the housing for guiding a tempering fluid through it. The term "tempering fluid," in this context, means a fluid, that could be a gas, but is preferably a liquid, that can serve for both heating and cooling purposes, i.e. it could be heated by the present heat generating apparatus, and (alternatively) cooled by a separate device which is not subject of the present invention. To this end, a conveying rotor is arranged at least partially in the channel for driving the tempering fluid through it, and is driven by a driving device which rotates a shaft of the conveying rotor. A shearing arrangement shears the viscous fluid in order to generate heat.

If a control for controlling the magnitude of a relative movement between at least one shearing plate element and a rotor wall is provided in order to control the magnitude of relative movement between them, the control will be further simplified as compared with known valve control units (which involve a certain inertia) if the control unit comprises at least one electromagnet which receives control signals of a control stage which, preferably, includes at least one sensor for a for sensing a temperature influence parameter. Such parameter will normally be the temperature, but can also comprise an anemometer, sunshine intensity and so on. It is clear with an electric control, a smaller inertia and control time constant will be achieved than with a valve control unit. Within the scope of the invention, this may be realized by using a controllable coupling interposed between the drive and the shaft, the (electric) control unit controlling the coupling, which may be, in particular, a quick response electromagnetic coupling.

BRIEF DESCRIPTION OF THE DRAWINGS

Further details and characteristics will become apparent from the following description of embodiments schematically shown in the drawings in which.

DESCRIPTION OF PREFERRED EMBODIMENTS

Figure 1:
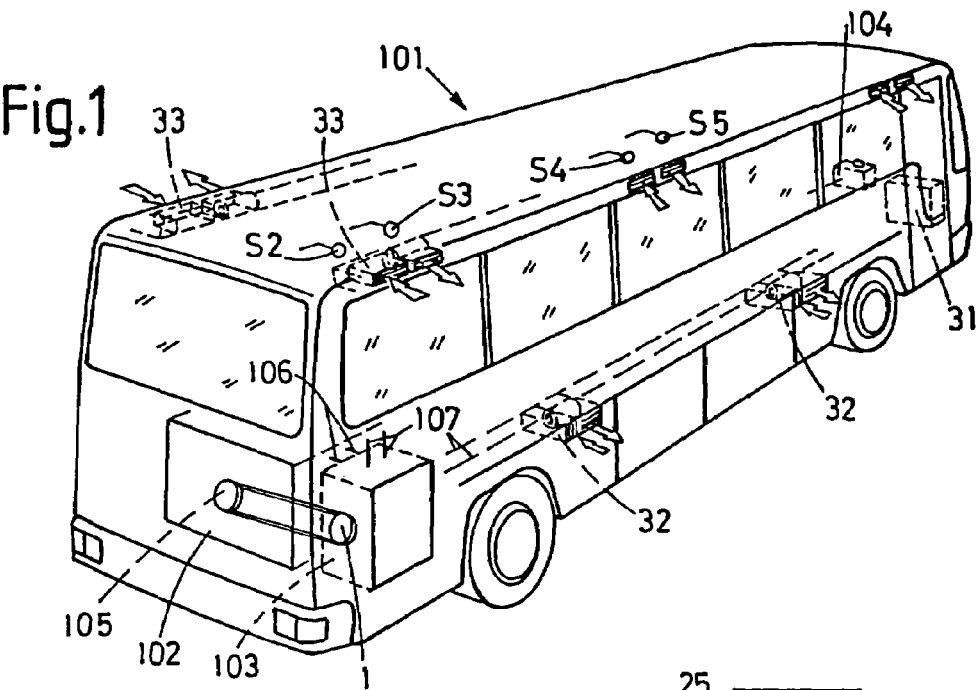
FIG. 1 is a perspective view of a vehicle provided with a heat generating apparatus according to the present invention and with the corresponding circulation channels.

In FIG. 1, a vehicle is represented provided with a driving motor 102, such as a gasoline engine or a diesel engine, in its rear portion. Motor 102 drives a drive wheel 1 of a tempering unit 103 though a belt pulley 105, generally a V-belt pulley, but, if desired, a chain wheel. The tempering unit may preferably comprise a cooling arrangement of a known type (which is, therefore, not represented) as well as a heat generating apparatus according to the present invention. It will be understood that the invention is not restricted to a certain type of vehicle, but could also be used in private cars or in trucks. It has also been mentioned above that the heat generating apparatus could even be used for heating stationary rooms or spaces.

Tempering unit 103 comprises connections 106 for the cooling circuit of motor 102 as well as connections 107 for circulating a fluid, such as water, for tempering an air condition unit within the interior of the vehicle 101. Thus, it will be understood that the heat generating apparatus according to the present invention could also be used for heating a room and/or the cooling water of a vehicle, e.g. for starting a motor 102 in winter. The circulation over the connections 107 reaches preferably heat exchangers 31–33 known per se.

Figure 2:
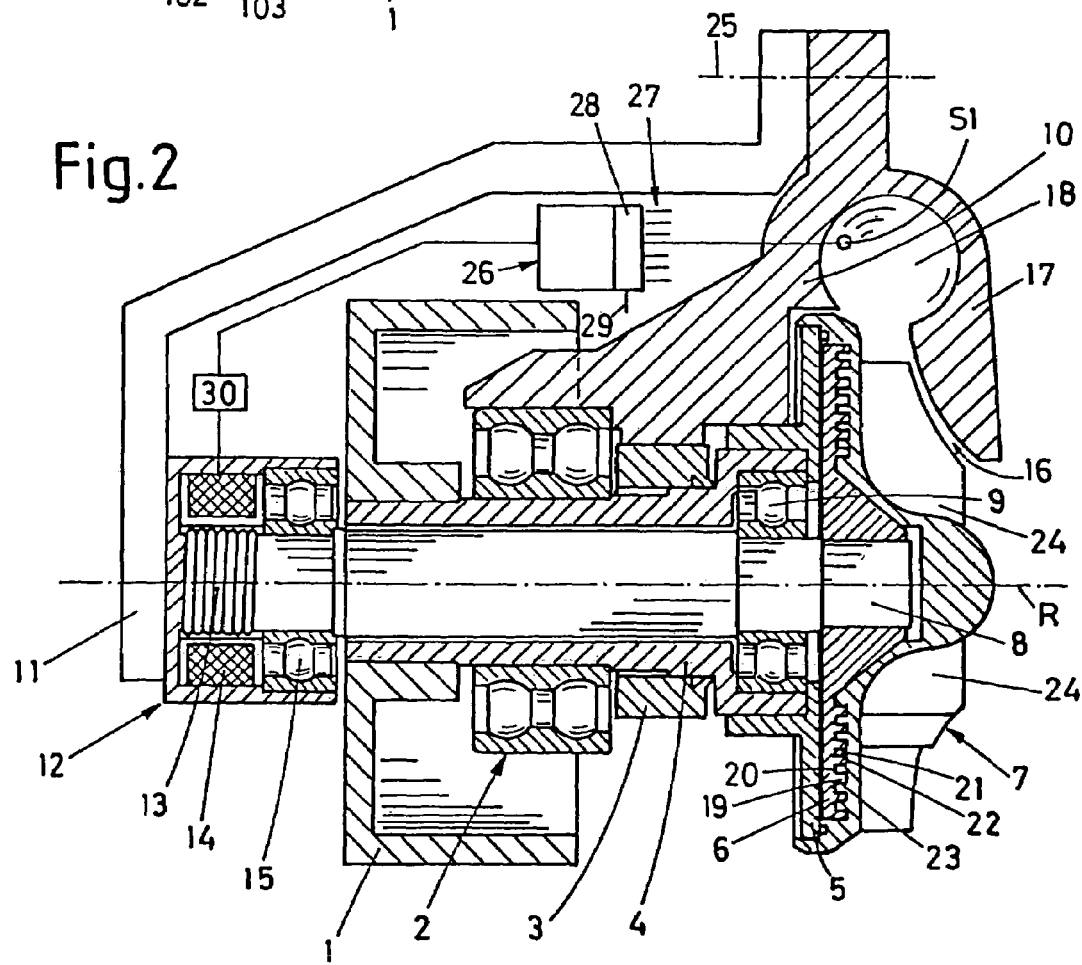
FIG. 2 a first embodiment of a heat generating apparatus according to the invention.

FIG. 2 illustrates in detail the construction of a heat generating apparatus according to a first preferred embodiment. In FIG. 2, the driving wheel or pulley is fixed to a hollow shaft 4, for example by wedging. The opposite end of the hollow shaft 4 carries a driving disk 5 which is also fixed to the shaft 4 in any desired way. An impeller wheel 7 (having impeller blades 24) of a water pump for conveying a tempering fluid, such as water, is sealingly fastened to the driving disk 5. The impeller wheel 7 is accommodated within a rotor space 16 of a housing 17 (illustrated only in part, i.e. solely the upper half is represented) that is connected to the connections 106 and/or 107 (FIG. 1).

In this way, the impeller wheel 7 draws in tempering fluid along its axis of rotation R, and discharges it to a radially outer channel 18 which is connected to the communicating with the connection pipes 106 and/or 107, and over which the fluid is then conveyed further (see circulation paths to heat exchangers 31–33 in FIG. 1). Since the impeller wheel 7 is rigidly connected to the shaft 4 as it is the case with the driving belt pulley 1, the impeller wheel is driven at the same rotational speed as corresponds to the rotational speed of the motor 102 (FIG. 1) and the transmission ratio of the two belt pulleys 105 and 1.

It will be understood that the present invention is not restricted to the use of a pump having an impeller wheel 7 as a conveyor rotor. In the case of a gaseous tempering fluid, an appropriate fan would be used, for example, instead of a pump rotor 7.

In order to heat the tempering fluid conveyed within the channel 18, a shearing plate 6 is provided in the hollow interior of the impeller wheel 7, said shearing plate 6 performing a relative rotation in relation to the wheel 7. This shearing plate 6 has preferably axial projections 19 alternating with recesses 20 which engage corresponding and complementary projections 21 and recesses 22 at the inner surface of the conveying rotor or impeller wheel 7. Since the impeller wheel 7 joins close to the driving disk 5, a narrow gap 23 will result between the interengaging projections 19 and 21, wherein a viscous liquid can be subjected to very efficient shearing. The advantage of such a fully closed system, where the viscous fluid has not to be conveyed at least during operation, is that the viscous liquid remains practically permanently in the gap-like interspace 23, and no valves are necessary for supplying it. In this respect, the construction shown needs minimal maintenance expenditure.

In order to obtain relative rotation between the impeller wheel 7 and the shearing plate 6, a shaft-like holding device 8 is provided within the hollow shaft 4. It will be understood that the holding function could also be fulfilled, if the part 8 had a shape different from that of a shaft, but a shaft-like holding device facilitates bearing and supporting. An outer anti-friction bearing 2 supports the hollow shaft 4, whereas bearings 9 and 15 are each provided at an end region of the shaft-like holding device 8. The rod-like or shaft-like holding device 8 is machined as a form-turned piece having different diameters for securely fastening the various parts. Also, an annular sealing element 3 is provided within the housing 17 (whose lower portion has been omitted in FIG. 2 for the sake of clarity).

By means of the holding device 8, the shearing plate 6 may be held stationary as a stator plate. In this case, a maximum of shearing forces within the gap 23 will be obtained by the cooperation with the inner surface of the impeller wheel 7. The viscous liquid in this gap will be significantly heated, thus also heating the impeller wheel which is preferably formed of a heat conductive metal, such as a non-iron metal, for example aluminum, i.e. of a metal having a higher thermal conductivity k (or k) than 100 kcal/m h degree. Aluminum, for example, has a thermal conductivity of 180 kcal/m h degree and more depending on the alloy, while copper is at or above 300. This heat transmitted to the wheel 7 is, virtually without any loss, immediately absorbed by the tempering fluid which has access to the impeller wheel through the channel portion along the axis R, and is discharged via the channel 18.

Figure 3:
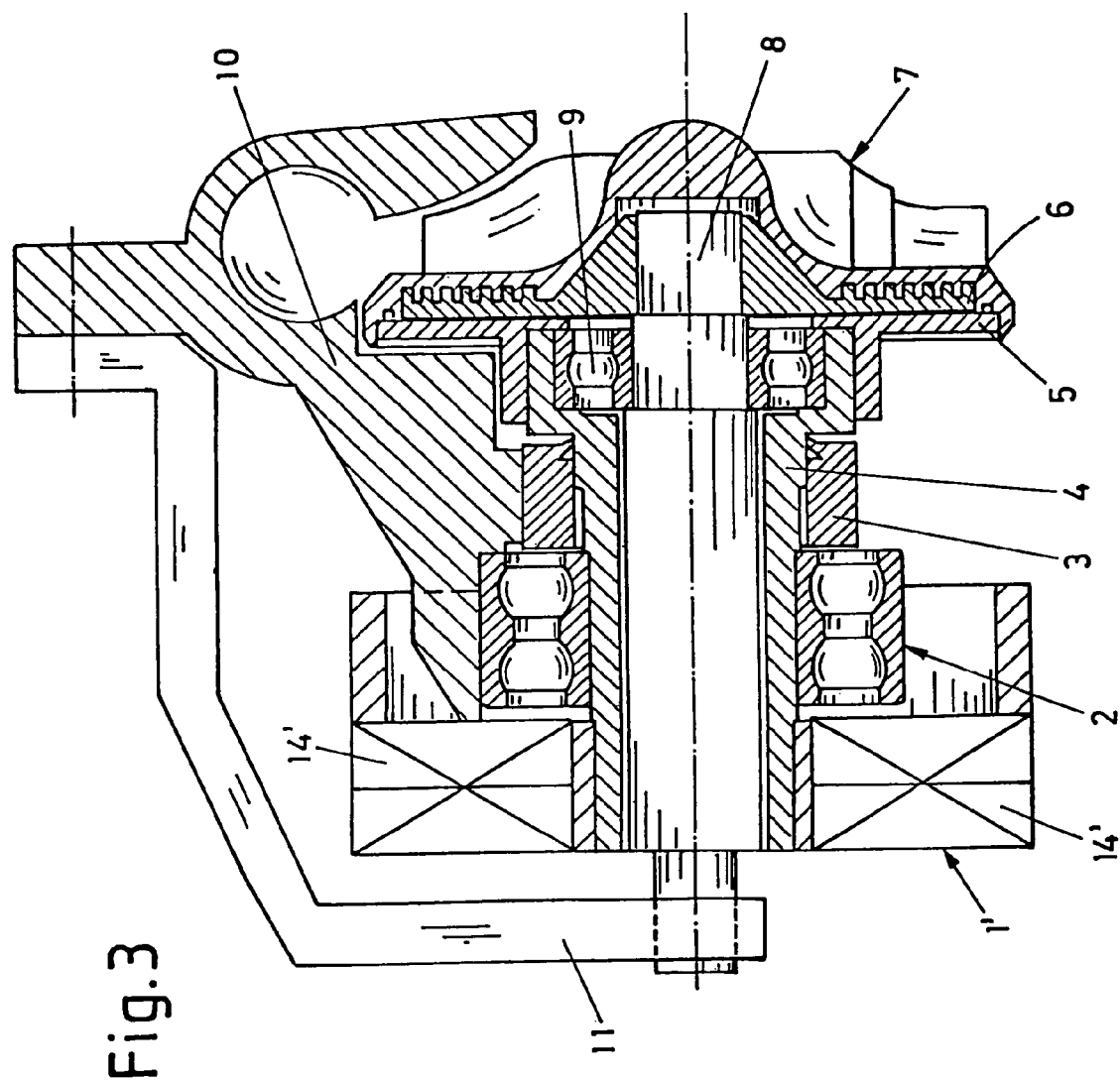
FIG. 3 is a second embodiment of a heat generating apparatus according to the invention.

It is to be understood that, although FIGS. 2 and 3 show preferred embodiments, the shearing arrangement can be changed within the scope of the present invention, for example in the way as described above with reference to the prior art. Thus, those skilled in the art will appreciate that the invention is not restricted to a certain shearing arrangement.

In order to be able to change or control, the amount of heat generated or the magnitude of the relative motion generating it between the shearing plate 6 and the inner surface if the impeller wheel 7, two possibilities are conceivable. Either the holding device 8 obtains the possibility of rotating and/or rotation of the hollow shaft 4, and thus of the impeller wheel 7, is subjected to control. In principle of course, a combination of both possibilities is also conceivable, for example by operatively interconnecting both rotor parts 4 and 8 by a differential gear, the magnitude of relative motion being adjusted by braking the differential cage gear.

In the embodiment according to FIG. 2, another approach is shown. A strap 11 is mounted to the housing 17 by means of screws 25 merely indicated in dotted lines. This strap holds a braking housing 12 in which a braking magnetic coil 14 acts upon a braking winding or spring 13 in such a manner that this winding winds around and brakes the stator shaft 8 more or less in accordance with electromagnetic actuation. The extent of braking can, for example, be adjusted within the vehicle 101 (FIG. 1), e.g. by actuating a button or key on a control box 104, but FIG. 2 shows still another possibility.

It is possible to achieve a temperature dependent control by providing at least one sensor S1 for sensing a temperature influence parameter, such as a temperature itself. Such a sensor S1 may be provided, for example, within the circuit of the tempering fluid, such as in channel 18. However, particularly in the case of air conditioning, it could be useful to provide at least two or more temperature sensors, such as S1 (FIG. 2) and S2, S3, S4, S5 and so on (see FIG. 1) which give an output signal corresponding to the measured temperature. Other measurements which could have an influence on temperature or the feeling of heat could be the measurement of wind, of air humidity, of luminosity (sunshine) and so on.

In such a case it could be favorable if the temperature values measured at different places have a different influence to the control. Therefore, it is advantageous if a control stage or circuit 26 is provided wherein the output signals arriving through different input lines from the sensors S1 to SS . . .

as well as signals from the control box 104, if desired, are appropriately mixed, be it by adding, subtraction or another mathematical operation.

Since in the case of a neuronal network the so-called input layer 28 has a weighting function for weighting the input signals, and the input layer is followed by a summing stage (see *Technology, Law* and *Insurance, Vol.* 5, Nos. 3/4, September/December 2000, p. 199–202, edition E & FN Spohn, the disclosure of which is hereby incorporated herein by reference), it shows well that the use of neuronal network for controlling purposes is especially advantageous. Although the application of a neuronal network is described here in the context of accommodating a shearing arrangement within the conveyor rotor 7, it will be understood that the use of a weighting control, such as particularly a neuronal network control, has an even independent inventive character.

It may be advantageous to form the neuronal network 26, 28 as an adaptive network. For weighting carried out by the input layer 28 could have to be done in a different way in dependence on the actual weather situation. Therefore, an adaptor input 29 is provided for adapting weighting. This adaptor input may be coupled to and controlled by a sensor for the outer temperature, i.e. the temperature outside the vehicle 101. However, it is also possible to optimize the relationship between the motor temperature and the inner temperature of the vehicle 101.

An output line from the control stage 26, 28 transmits either an analogue signal or a digital signal and controls with it a switching stage for the magnetic coil 14. Using an analogue signal, it is possible to brake more smoothly or more vigorously while with a digital signal (without further conversion) only full braking or release will be possible.

Also in this context, the invention is not restricted to a certain type of control, since various known control possibilities have already been pointed out above which are at the disposal of those skilled in the art In FIG. 3, parts of the same function have the same reference numerals as in FIG. 2, while parts of a similar function have the same reference numeral, but with an additional sign added. With reference to this embodiment, the other possibility indicated above is shown, i.e. to decelerate operation of the impeller wheel 7 or to switch it off as soon as a desired temperature has been reached. The details of the associated control will not be described again, but it is referred in this respect to FIG. 2

According to FIG. 3, the driving belt pulley 1' is formed with an integrated electromagnetic coupling having coils 14', as is known from AC compressor couplings. Therefore, the details of control of such a coupling needs not to be described in detail. The coupling and its coils 14' control entrainment of the hollow shaft 4 by the driving belt pulley 1', whereas the strap 11 arrests the holding device 8 completely. It has, however, been mentioned already that a combination of both embodiments of FIGS. 2 and 3 would be conceivable in order to be able to control heating and conveying independently from each other.

When comparing the embodiments of FIGS. 2 and 3, it will be seen that in the formed case the shearing plate 6 can be held stationary by the braking device in which case a maximum shearing effect is obtained with reference to the rotating impeller wheel 7, thus generating maximum heat. In contrast, with completely unbraked shearing plate 6 (intermediate conditions would be possible using an analogue control), only fluid id conveyed, but due to the co-rotating shearing plate 6, would not be heated.

The function is different in the case of the embodiment according to FIG. 3. When the impeller wheel 7 is rotated via the coupling having coils 14', a shearing effect with the shearing plate 6 will develop automatically so that in this case there is both a heating function as well as a conveying function. When the coupling is switched off, the impeller wheel 7 comes to a still stand and neither of the two functions will occur. This consideration shows well that the two embodiments (or combinations of them) can easily be chosen in adaptation to the respective requirements of a case.

Of course, numerous modifications are conceivable within the scope of the present invention. For example, relative rotation between the two parts 6 and 7 could theoretically also be achieved by rotating the two parts in opposite directions, for example by using a differential gear as mentioned above. Moreover, an electromagnetic control has been shown with reference to the embodiments of FIGS. 2 and 3, but braking or coupling could be carried out in a purely mechanical way, for example by pressing to interengaging cones (as in a cone coupling or cone brake) more or less one against the other.

Furthermore, more than one, or several concentric shearing plates (e.g. ring-shaped) could be used, e.g., each having a different rotational speed. Two opposite shearing plates could also be used so that, for example, the projections 19 of one plate faces the inner surface of the impeller wheel 7 to the right (as shown in the figures), while the other one faces the left inner wall of the impeller wheel. When providing more than one shearing plate, it is not necessary to form them equally.

In addition, a conical gap could be used (as known in the prior art), particularly since the impeller wheel 7, as shown, has more or less the shape of a hollow cone. In this case, shearing adjustment could be done by an axial displacement of the holding shaft 8 in order to adjust the gap between the conical inner surface of the impeller wheel 7 and a corresponding shearing cone.

With reference to both embodiments, the accommodation of the holding device 8 in a hollow shaft has been described which, of course, is most space saving. Theoretically, however, the impeller rotor 7 could be driven by its periphery (being either formed as a belt pulley or being toothed to engage a tooth gear) so that a hollow shaft is not necessary in all cases.

It will be convenient to form the chamber, which receives and holds the viscous liquid, is merely formed as a gap 23, because in this way, practically the whole volume of the viscous liquid participates in the shearing effect, thus avoiding that part of the generated heat can get lost. Nevertheless, it would be possible to provide even a larger chamber.

For the above discussed electromagnetic control, only one electromagnet 14 or 14' has been used. If desired, two electromagnets could be used which act in opposite directions.

Above, control has been described to comprise a neuronal network in FIG. 2, but the invention is not restricted to it. As an alternative, a fuzzy control could be used, because also in a fuzzy control a certain weighting of the input signals is effected, thus constituting also a weighting control facility.

In the above description of the embodiments, a circulation of the tempering fluid was assumed. Of course, the invention is not restricted to a circulation since, if desired, a consumable fluid, such as air, could be used for the purpose of tempering. Nevertheless, it is preferred within the scope of the invention to circulate the tempering fluid.

In any case, special advantages are achieved by the present invention:
1. Heat transmission from the shearing arrangement to the tempering fluid is effected with higher efficiency;
2. The heating generator is particularly compact and needs less space than conventional heaters;
3. The construction is particularly simple, because heat transmission from the shearing arrangement to the tempering fluid can be effected without any special control; and
4. No circulation of the viscous liquid is necessary, i.e. accouterments for it can be omitted.

While the invention has been described in connection with one or more embodiments, it is to be understood that the specific mechanisms, processes and procedures which have been described are merely illustrative of the principles of the invention, numerous modifications may be made to the methods and apparatus described without departing from the spirit and scope of the invention as defined by the appended claims.

What is claimed is:

1. A viscous fluid type heat generating apparatus comprising:
   housing means;
   channel means in said housing means for guiding a tempering fluid through them;
   conveying rotor means arranged at least partially in said channel means for driving said tempering fluid through said channel means, said conveying rotor means being hollow to form a chamber at least partially surrounded by a rotor wall of said conveyor rotor means for containing said viscous fluid;
   drive means for rotating said conveying rotor means
   shaft means driven by said drive means and being connected to said conveying rotor means; and
   shearing means in said chamber of said hollow conveying rotor means for generating heat by shearing said viscous fluid, said heat being transferred via said conveying rotor means to said tempering fluid in said channel means, wherein said chamber is fully surrounded by said rotor wall at least in operation.

2. A viscous fluid type heat generating apparatus comprising;
   housing means;
   channel means in said housing means for guiding a tempering fluid through them;
   conveying rotor means arranged at least partially in said channel means for driving said tempering fluid through said channel means, said conveying rotor means being hollow to form a chamber at least partially surrounded by a rotor wall of said conveyor rotor means for containing said viscous fluid;
   drive means for rotating said conveying rotor means;
   shaft means driven by said drive means and being connected to said conveying rotor means; and
   shearing means in said chamber of said hollow conveying rotor means for generating heat by shearing said viscous fluid, said heat being transferred via said conveying rotor means to said tempering fluid in said channel means, said shearing means including
   at least one shearing plate element for cooperating with said rotor wall, and
   means providing relative movement of said shearing plate in relation to said rotor wall.

3. Apparatus as claimed in claim 2, wherein said shaft means comprise a hollow inner space, said relative movement providing means comprising holding means arranged within said inner space for holding said at least one shearing plate element.

4. Apparatus as claimed in claim 3, wherein said holding means are formed as a shaft which extends along said inner space.

5. A viscous fluid type heat generating apparatus comprising;
   housing means;
   channel means in said housing means for guiding a tempering fluid through them;
   conveying rotor means arranged at least partially in said channel means for driving said tempering fluid through said channel means, said conveying rotor means being hollow to form a chamber at least partially surrounded by a rotor wall of said conveying rotor means for containing said viscous fluid;
   drive means for rotating said conveying rotor means
   shaft means driven by said drive means and being connected to said conveying rotor means; and
   shearing means in said chamber of said hollow conveying rotor means for generating heat by shearing said viscous fluid, said heat being transferred via said conveying rotor means to said tempering fluid in said channel means, said shearing means including at least one shearing plate element for cooperating with said rotor wall, means providing relative movement of said shearing plate in relation to said rotor wall; and
   control means for controlling the magnitude of the relative movement between said at least one shearing plate element and said rotor wall.

6. Apparatus as claimed in claim 5, wherein said control means comprise electric control means.

7. Apparatus as claimed in claim 6, further comprising sensor means for sensing a temperature influence parameter, said sensor means providing an output signal.

8. Apparatus as claimed in claim 7, wherein said sensor means comprise at least two sensors so as to provide an output signal of each of it, and control means comprising a weighting control circuit for weighting said output signals.

9. Apparatus as claimed in claim 8, wherein said weighting control circuit comprises a neuronal network.

10. Apparatus as claimed in claim 5, wherein said control means comprises
    electric control means providing at least one control signal, and
    electromagnetic means receiving said control signal for controlling the magnitude of the relative movement.

11. Apparatus as claimed in claim 5, wherein said control means comprise braking means for braking said shearing plate element.

12. Apparatus as claimed in claim 11, further comprising controllable coupling means interposed between said drive means and said shaft means, said control means controlling said coupling means.

13. Apparatus as claimed in claim 1, wherein said shearing means comprise at least two opposing shearing parts, said shearing parts including interengaging projections and recesses.

14. Apparatus as claimed in claim 1, wherein said chamber is formed as a gap at least in part.

15. Apparatus as claimed in claim 1 wherein said conveying rotor means are formed of metal having a higher thermal conductivity k than 100 kcal/m h degree.

16. Apparatus as claimed in claim 15 wherein said conveying means are formed of aluminum.

* * * * *